United States Patent
Hedtke et al.

(10) Patent No.: US 9,588,003 B2
(45) Date of Patent: Mar. 7, 2017

(54) ISOLATOR SYSTEM FOR A PRESSURE TRANSMITTER

(71) Applicant: Rosemount Inc., Chanhassen, MN (US)

(72) Inventors: Robert C. Hedtke, Young America, MN (US); Eric Petersen, Minnetonka, MN (US)

(73) Assignee: Rosemount Inc., Shakopee, MN (US)

( * ) Notice: Subject to any disclaimer, the term of this patent is extended or adjusted under 35 U.S.C. 154(b) by 553 days.

(21) Appl. No.: 14/037,767

(22) Filed: Sep. 26, 2013

(65) Prior Publication Data

US 2015/0082892 A1 Mar. 26, 2015

(51) Int. Cl.
*G01L 19/00* (2006.01)
(52) U.S. Cl.
CPC ................................ *G01L 19/0046* (2013.01)
(58) Field of Classification Search
CPC .................................................. G01L 19/0046
See application file for complete search history.

(56) References Cited

U.S. PATENT DOCUMENTS

| 4,120,206 | A | 10/1978 | Rud, Jr. |
| 5,524,492 | A | 6/1996 | Frick et al. |
| 6,050,145 | A | 4/2000 | Olson et al. |
| 6,105,437 | A | 8/2000 | Klug et al. |
| 6,662,662 | B1 * | 12/2003 | Nord et al. ............. 73/715 |
| 8,099,856 | B2 | 1/2012 | Lutz |

OTHER PUBLICATIONS

International Searching Authority, Search Report and Written Opinion, Jan. 21, 2015, 10 pages.

* cited by examiner

*Primary Examiner* — Laura Martin
*Assistant Examiner* — Herbert K Roberts
(74) *Attorney, Agent, or Firm* — Kinney & Lange, P.A.

(57) ABSTRACT

An isolator system for a pressure transmitter includes a port internal to the transmitter, a sensor tube, and a fill tube. The sensor tube is connected to the port to fluidly connect a passageway through a transmitter body to a pressure sensor. The sensor tube includes a first end disposed in the port. The first end has a first cross-sectional area. The fill tube is internal to the transmitter and connected to the port to fluidly connect to the passageway. The fill tube includes a second end disposed in the port. The second end of the fill tube has a second cross-sectional area that is less than the first cross-sectional area of the sensor tube.

18 Claims, 5 Drawing Sheets

ISOLATOR SYSTEM FOR A PRESSURE TRANSMITTER

BACKGROUND

The present invention relates generally to pressure transmitters for use with industrial processes. In particular, this invention relates to an isolator system used in pressure transmitters.

Isolator systems in pressure transmitters use a relatively inert isolator liquid that couples pressure from a process fluid to a pressure sensor. This is necessary because pressure sensors are not generally designed to withstand direct contact with a process fluid. A flexible isolator diaphragm separates the process fluid from the isolator liquid, which is typically silicone oil. Tubes and passageways that are filled with the oil are used to couple pressure from the isolator diaphragm to the pressure sensor. Isolator systems prevent process fluids from contacting and interfering with the operation of the pressure sensor.

The oil-filled tubes and passageways are kept narrow to reduce the quantity of oil used in the isolator system and limit the pressure effects due to thermal expansion and contraction of the oil. The narrow passageways, however, may restrict the flow of oil and slow down the response of the pressure sensor. An isolator system is desired that has a low isolator liquid volume but which does not inhibit rapid response of the pressure sensor.

SUMMARY

One embodiment of the present invention is an isolator system for a pressure transmitter including a port internal to the transmitter, a sensor tube, and a fill tube. The sensor tube is connected to the port to fluidly connect a passageway through a transmitter body to a pressure sensor. The sensor tube includes a first end disposed in the port. The first end has a first cross-sectional area. The fill tube is internal to the transmitter and connected to the port to fluidly connect to the passageway. The fill tube includes a second end disposed in the port. The second end of the fill tube has a second cross-sectional area that is less than the first cross-sectional area of the sensor tube.

Another embodiment of the present invention is a pressure transmitter including a transmitter body, an isolator diaphragm, a pressure sensor, a fill tube, and isolator liquid. The transmitter body includes an isolator rim around a concavity that is fluidly connected to a port internal to the transmitter by way of a passageway through the transmitter body. The isolator diaphragm includes a diaphragm rim sealed to the isolator rim. The pressure sensor fluidly connects to the passageway by a sensor tube. The fill tube is internal to the transmitter and fluidly connects to the passageway. The isolator liquid is within the sensor tube, the fill tube, the passageway, and the concavity between the isolator diaphragm and the transmitter body. The fill tube is adapted to seal the isolator liquid within the transmitter. The sensor tube includes a first end disposed in the port. The fill tube includes a second end disposed in the port. The first end of the sensor tube has a first cross-sectional area, the second end of the fill tube has a second cross-sectional area, and the first cross-sectional area is greater than the second cross-sectional area.

DETAILED DESCRIPTION

Embodiments of the present invention provide an isolator system suitable for use with an industrial pressure transmitter. Isolator systems embodying the present invention employ an improvement to an invention for a pressure transmitter including an oil fill tube and a sensor tube shaped to fit together in a single port, as described in U.S. Pat. No. 6,662,662, "PRESSURE TRANSMITTER WITH IMPROVED ISOLATOR SYSTEM" assigned to Rosemount Inc., incorporated herein by reference.

In embodiments of the present invention, the isolator system is improved by allocating a majority of the total cross-sectional area of the sensor tube and the oil fill tube to the sensor tube. A greater sensor tube cross-sectional area reduces the flow impedance through the sensor tube without increasing the size of the port or the amount of oil fill in the port. As a result, in operation, the response time between a pressure change at the isolator diaphragm and detection of the pressure change at the sensor is not significantly slowed by the sensor tube end within the port. The correspondingly smaller oil fill tube cross-sectional area increases flow impedance through the oil fill tube and increases the time required to fill the isolator system with oil. However, this is not of concern because the oil fill process happens only during the process of manufacturing the pressure transmitter.

Figure 1:
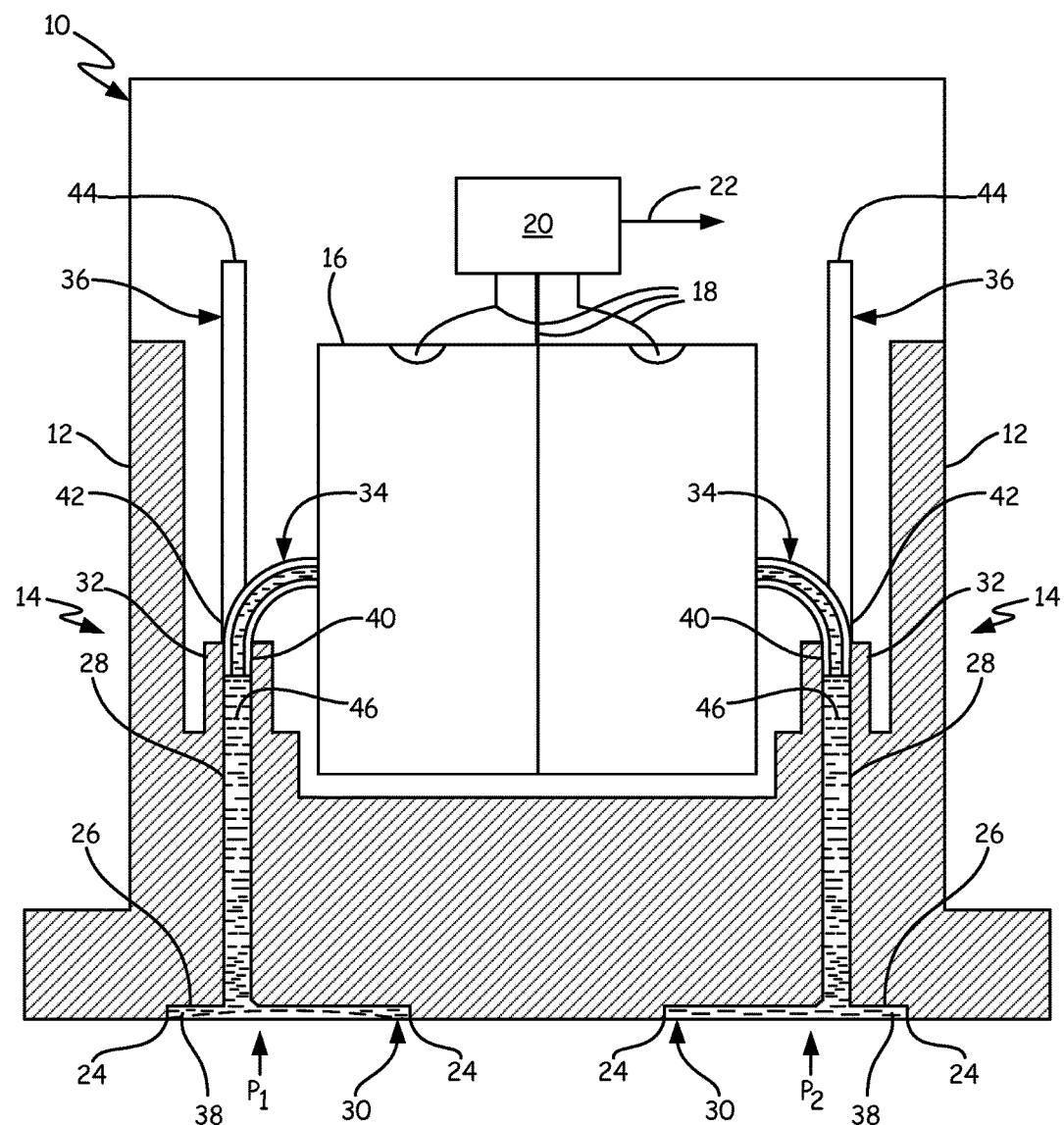
FIG. 1 is a schematic cross section illustrating a pressure transmitter including an isolator system.

FIG. 1 is a schematic cross section illustrating a pressure transmitter including an isolator system. As shown in FIG. 1, pressure transmitter 10 includes transmitter body 12, isolator system 14, pressure sensor 16, sensor output line 18, transmitter circuit 20, and transmitter line 22. Isolator system 14 includes isolator rim 24, concavity 26, passageway 28, isolator diaphragm 30, port 32, sensor tube 34, and fill tube 36. Isolator diaphragm 30 includes diaphragm rim 38. Sensor tube 34 includes first end 40. Fill tube 36 includes open end 44 and second end 42.

Figure 3:
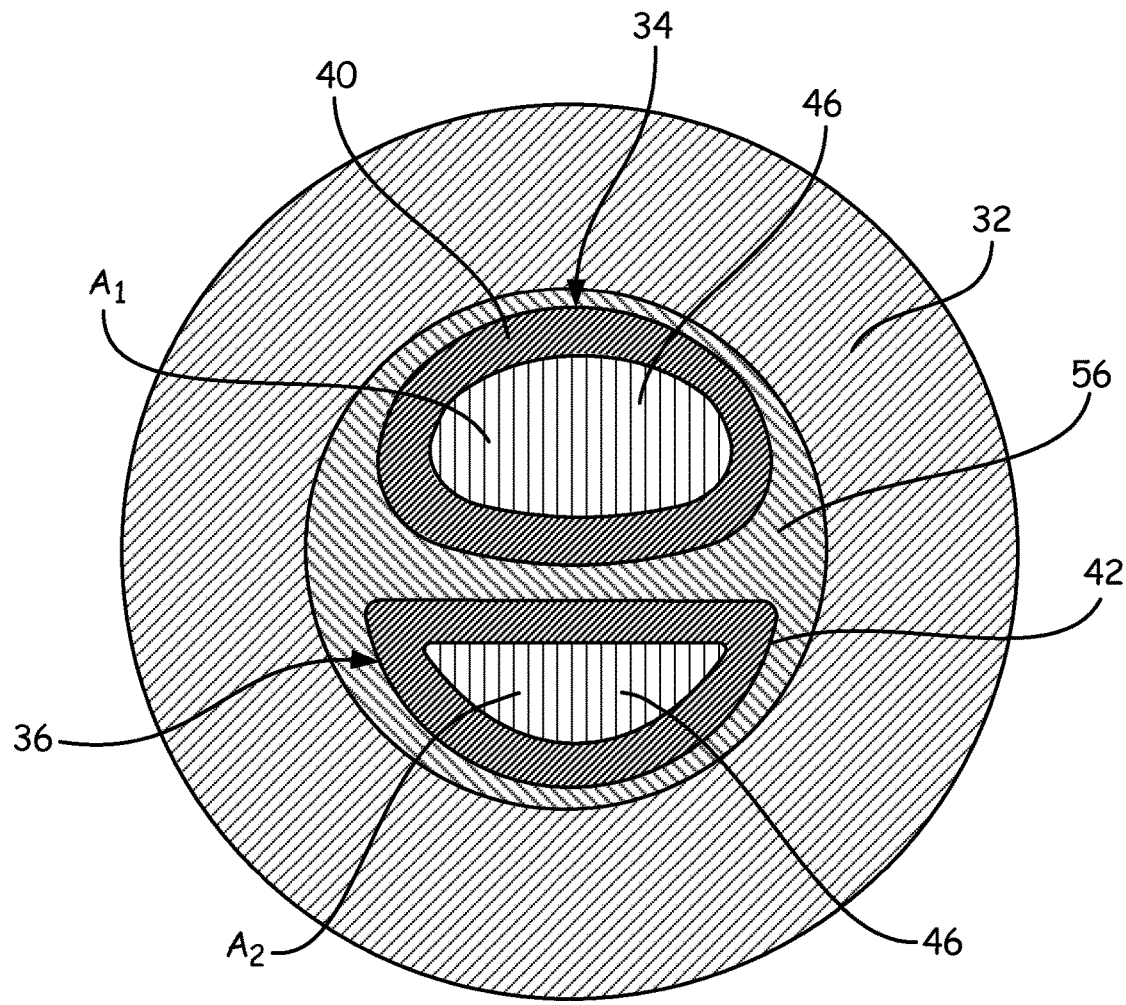
FIG. 3 illustrates two "D" shaped tube ends connected together in a common round port of the transmitter body.

Concavity 26 is formed into an exterior of transmitter body 12, defining isolator rim 24. Port 32 is internal to transmitter 10 and fluidly connected to concavity 26 by way of passageway 28 through transmitter body 12. Diaphragm rim 38 at a periphery of isolator diaphragm 30 is sealed to isolator rim 24, preferably by welding, forming a space between concavity 26 and isolator diaphragm 30. First end 40 of sensor tube 34 and second end 42 of fill tube 36 are both disposed in the port 32, as described below in reference to FIG. 3. Port 32 is preferably round (as shown in FIG. 3) and is raised beyond transmitter body 12 within transmitter 10 to form a boss. Sensor tube 34 fluidly connects pressure sensor 16 to passageway 28.

Isolator liquid 46 fills the passageways in isolator system 14 including sensor tube 34, fill tube 36, passageway 28, concavity 26 between isolator diaphragm 30 and transmitter body 12, and internal passageways (not shown) within differential pressure sensor 16. Fill tube 36 initially has open end 44 that is temporarily connected to a charging manifold (not shown) during the manufacturing process. The charging manifold is connected to a vacuum pump and is used to evacuate the passageways in isolator system 14 so that there is no trace of air or moisture left in the passageways. Next, the charging manifold is used to supply a quantity or charge of isolator liquid 46 that fills the passageways in isolator system 14. The isolator liquid 46 is typically a de-gassed silicone oil that has low compressibility so that it can accurately transfer pressure. After the isolator system 14 is filled with isolator liquid 46, fill tube 36 is pinched shut and then brazed or welded shut at open end 44.

In the embodiment of FIG. 1, pressure transmitter 10 is a differential pressure transmitter, thus pressure sensor 16 is a differential pressure sensor receiving pressure by way of two similar or identical isolator systems 14. As illustrated in FIG. 1, pressure $P_1$ is at a higher pressure and pressure $P_2$ at a lower pressure. Isolator diaphragms 30 are deflectable in response to pressure, thus applying pressure related to pressures $P_1$, $P_2$ into passageways 28. Pressure sensor 16 receives pressures from ports 32 via sensor tubes 34. Pressure sensor 16 generates separate pressure output signals on two lines 18 which couple to a transmitter circuit 20. Transmitter circuit 20 generates a transmitter output on line 22 that represents the pressure differential between $P_1$ and $P_2$.

Figure 2A:
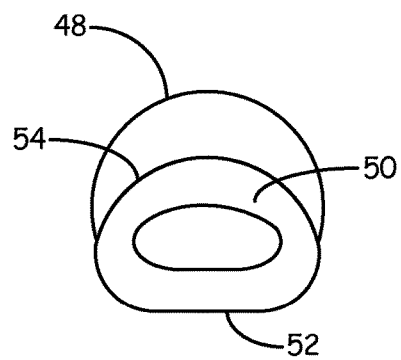
FIGS. 2A and 2B illustrate a tube having a "D" shaped end.
Figure 2B:
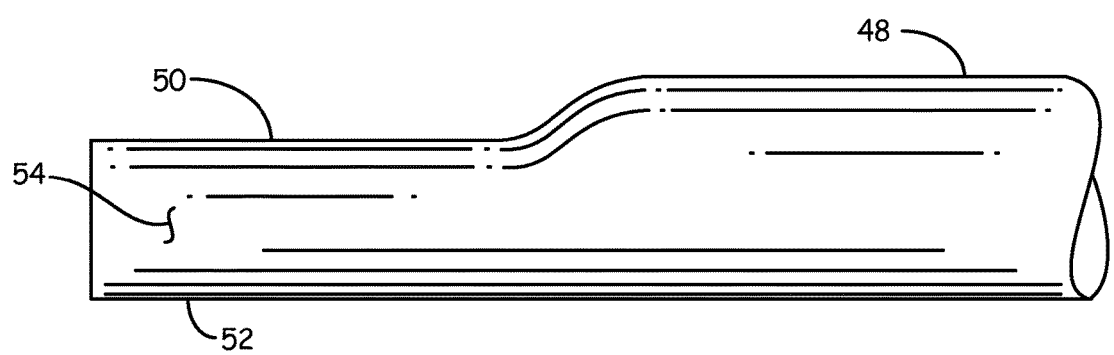

FIGS. 2A and 2B illustrate a tube having a "D" or half-circle shaped end that is applicable to first end 40 of sensor tube 34 and second end 42 for fill tube 36. FIG. 2A is a tube end view and FIG. 2B is a tube side view. As shown, generally cylindrical tube 48 has end 50 that has been distorted, shaped, or swaged to a shape that is generally a "D" shape, with a generally flat side 52 and a generally semicircular side 54.

FIG. 3 illustrates two "D" shaped tube ends as described in reference to FIGS. 2A and 2B and connected together in a common round port of the transmitter body. As shown in FIG. 3, first end 40 of sensor tube 34 and second end 42 of fill tube 36 are brought together in a bore extending through port 32. First end 40 and second end 42 have "D" or half-circle shapes that, when placed together on the respective flat sides, form a generally circular cross section that fits in port 32. As noted above in reference to FIG. 1, port 32 preferably is raised beyond transmitter body 12 to form a boss. This is to provide lower thermal mass for rapid brazing. Brazing preform or brazing paste 56 fills the gaps between first end 40, second end 42, and port 32. Various known braze, solder or welding processes can be used to complete this joint. After the joint has cooled, sensor tube 34 including first end 40 and fill tube 36 including second end 42 are filled with isolator liquid 46 as explained above.

First end 40 of the sensor tube 34 has first cross-sectional area A1. Second end 42 of the fill tube 36 has a second cross-sectional area A2. In all embodiments of the present invention, first cross-sectional area A1 is greater than second cross-sectional area A2. This may be described by ratio R which is defined as a ratio of first cross-sectional area A1 over a sum of first cross-sectional area A1 and second cross-sectional area A2. Thus, all embodiments of the present invention have ratio R greater than 50%. Of course, given manufacturing tolerances, embodiments of the present invention includes values of R significantly greater than 50%, that is, greater than 52%.

Figure 4:
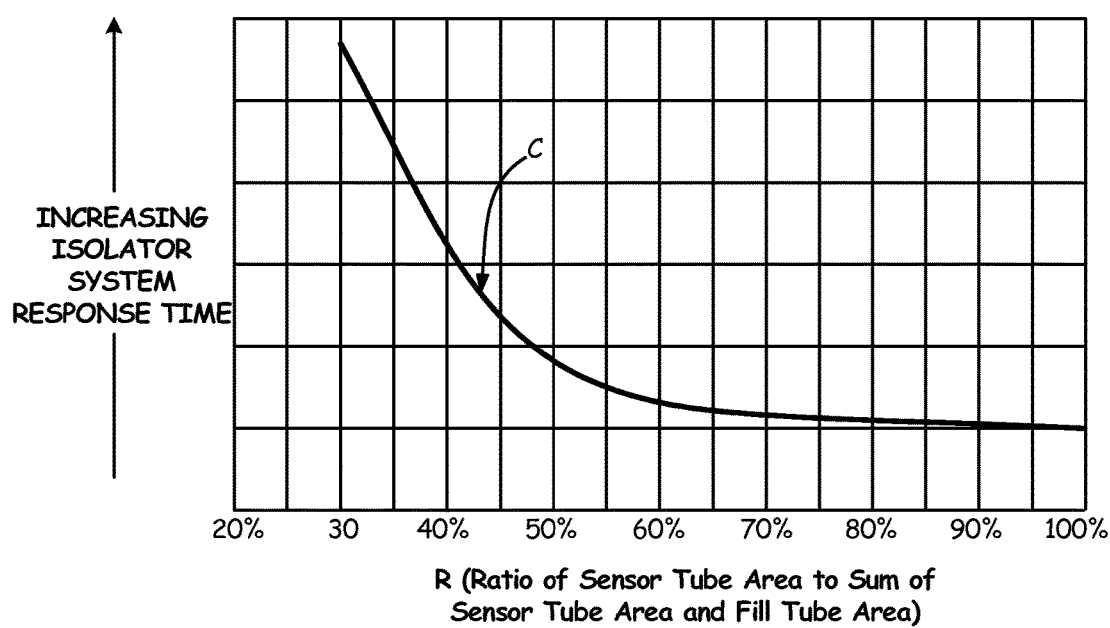
FIG. 4 graphically illustrates the relationship between sensor tube cross-sectional area and a time response of the isolator system.

The performance improvement provided in embodiments of the present invention is illustrated in FIG. 4. Curve C of FIG. 4 graphically illustrates the relationship between R and isolator system response time. As shown, as R decreases, particularly below 50%, the isolator system response time increases and the sensitivity of response time to changes in R is relatively large. This may result in process transmitters that do not indicate pressure changes as quickly as desired, and a greater variation in performance of the process transmitters produced. In contrast, as R increases significantly above 50%, the response time of isolator system 14 decreases to a level determined by limitations elsewhere in isolator system 14, not by cross-sectional area A1. In addition, the sensitivity of response time to changes in R becomes relatively small, as curve C flattens out. At the extreme, that is, R greater than 90%, cross-sectional area A2 may become too small to reliably oil fill. Thus, embodiments of the present invention preferably have R between 52% and 90%. Further, it is desirable to provide for additional manufacturing margin to insure a very high probability that all pressure transmitters 10 embody the present invention and do not result in either fill tubes that cannot be reliably filled or isolator systems having R at or below 50%. Thus, it may be more preferable to produce embodiments of the present invention that have R between about 60% and about 80%. For the greatest consistency in production of process transmitters 10 that embody the present invention, it may be most preferable to have R at approximately 67%, that is, between 65% and 69%.

Considering FIGS. 1, 2A, 2B, 3 and 4 together, isolator system 14 is improved by allocating a majority of the sum of cross-sectional area A1 of sensor tube 34 at first end 40 and cross-sectional area A2 of fill tube 36 at second end 42 to cross-sectional area A1. The resulting larger cross-sectional area A1 reduces the flow impedance through sensor tube 34 without increasing the size of port 32 or the amount of isolator liquid 46 in port 32. As a result, in operation, the response time between a pressure change at isolator diaphragm 30 and detection of the pressure change at pressure sensor 16 is not significantly slowed by the impedance of first end 40 of sensor tube 34. The correspondingly smaller oil fill tube cross-sectional area A2 at second end 42 increases flow impedance through fill tube 36 and increases the time required to fill isolator system 14 with isolator liquid 46. However, this is not of concern because the oil fill process happens only once during the manufacture of pressure transmitter 10. In addition, by fitting both first end 40 and second end 42 into port 32, an extra port that would otherwise be required to accommodate sensor tube 34 and fill tube 36 separately is not required, reducing manufacturing costs and reducing the amount of isolator liquid 46 in isolator system 14.

Figure 5:
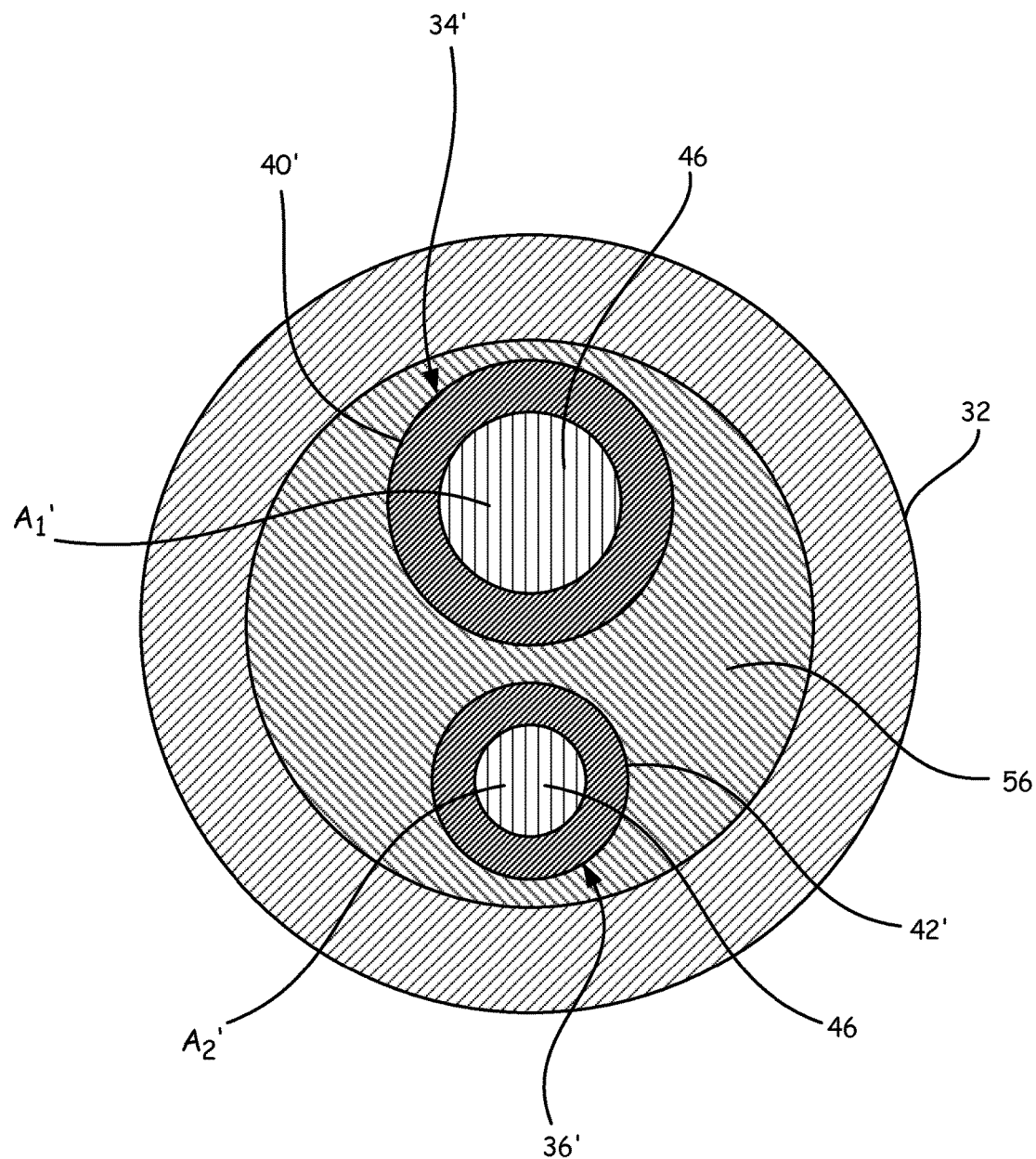
FIG. 5 illustrates two tubes of unequal diameters connected together in a common round port of the transmitter body.

FIG. 5 illustrates another embodiment of the present invention including two round tube ends of unequal diameters connected together in a common round port of the transmitter body. As shown in FIG. 5, first end 40' of sensor tube 34' and second end 42' of fill tube 36' are brought together in port 32. First end 40' and second end 42' have circular shapes that, when placed together, fit within port 32. Brazing preform or brazing paste 56 fills the gaps between first end 40', second end 42', and port 32. Various known braze, solder or welding processes can be used to complete this joint. After the joint has cooled, sensor tube 34' including first end 40' and fill tube 36' including second end 42' are filled with isolator liquid 46 as explained above.

First end 40' has first cross-sectional area A1'. Second end 42' has second cross-sectional area A2'. As with all embodiments of the present invention, first cross-sectional area A1' is greater than second cross-sectional area A2'. In contrast to the previous embodiment, the embodiment shown in FIG. 5 requires significantly more brazing paste 56 to fill the larger gaps between first end 40', second send 42', and port 32. However, circular end shapes may be more easily obtained and dimensionally controlled than the "D" shapes shown in FIG. 3. Otherwise, this embodiment has all of the advantages of the embodiment described above in reference to FIGS. 1, 2A, 2B, 3, and 4.

Although the embodiments describe above are illustrated for a differential pressure transmitter, it will be understood by those skilled in the art that the present invention encompasses embodiments for other pressure transmitters that may employ an isolator system, for example, an absolute pressure transmitter or a gauge pressure transmitter. It is also understood that other shapes can be used to fit a sensor tube and a fill tube into a common port provided that the cross-sectional area of the end of the sensor tube is greater than cross-sectional area of the end of the fill tube. For example, rectangular shaped tube ends can be fit together in a common rectangular port. It will also be understood by those skilled in the art that various types of known isolator liquids can be used.

Those of ordinary skill in the art will appreciate that the present invention provides numerous advantages and benefits. Embodiments of the present invention provide an isolator system that has a low isolator liquid volume but which does not inhibit rapid response of the pressure sensor. By allocating a majority of the total cross-sectional area of the sensor tube and the oil fill tube to the sensor tube, the flow impedance through the sensor tube is reduced without increasing the size of the port or the amount of oil fill in the port. As a result, in operation, the response time between a pressure change at the isolator diaphragm and detection of the pressure change at the sensor is not significantly slowed by the sensor tube end within the port. The use of one separate passage from the fill tube to the concavity and another separate passage from the sensor tube to the concavity is avoided. In addition, by fitting the sensor tube and the fill tube into a single port, an extra port that would otherwise be required to accommodate the sensor tube and the fill tube separately is not required. As a result, manufacturing costs are reduced, as is the quantity of isolator liquid used, improving temperature performance.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An isolator system for a pressure transmitter, the system comprising:
    a port internal to the transmitter;
    a sensor tube connected to the port to fluidly connect a passageway through a transmitter body to a pressure sensor, the sensor tube including a first end disposed in the port, the first end having a first cross-sectional area, said first cross-sectional area being perpendicular to a longitudinal axis of the sensor tube; and
    a fill tube internal to the transmitter, the fill tube connected to the port to fluidly connect to the passageway, the fill tube including a second end disposed in the port, the second end having a second cross-sectional area, said second cross-sectional area being perpendicular to a longitudinal axis of the fill tube, that is less than the first cross-sectional area of the sensor tube, wherein the first cross-sectional area is between 60% and 90% of a sum of the first cross-sectional area and the second cross-sectional area.

2. The system of claim 1, further comprising:
    an isolator rim around a concavity in the transmitter body, the concavity is fluidly connected to the port internal to the transmitter through the passageway;
    an isolator diaphragm including a diaphragm rim sealed to the isolator rim; and
    isolator liquid filling the sensor tube, the fill tube, the passageway, and the concavity between the isolator diaphragm and the transmitter body; the fill tube adapted to seal the isolator liquid within the transmitter.

3. The system of claim 2, wherein the first cross-sectional area is between 60% and 80% of the sum of the first cross-sectional area and the second cross-sectional area.

4. The system of claim 3, wherein the first cross-sectional area is approximately 67% of the sum of the first cross-sectional area and the second cross-sectional area.

5. The system of claim 1, wherein the first end and the second end have cross-sectional shapes that are at least one of a "D" shape and a half-circle shape.

6. The system of claim 1, wherein the first end and the second end have cross-sectional shapes that are circular.

7. The system of claim 1, wherein the first end and the second end are brazed into the port.

8. A pressure transmitter comprising:
    a transmitter body including an isolator rim around a concavity that is fluidly connected to a port internal to the transmitter by way of a passageway through the transmitter body;
    an isolator diaphragm including a diaphragm rim sealed to the isolator rim;
    a pressure sensor fluidly connected to the passageway by a sensor tube, the sensor tube including a first end disposed in the port;
    a fill tube internal to the transmitter, the fill tube fluidly connected to the passageway and adapted to seal isolator liquid within the transmitter, the fill tube including a second end disposed in the port;
    isolator liquid within the sensor tube, the fill tube, the passageway, and the concavity between the isolator diaphragm and the transmitter body;
    wherein the first end of the sensor tube has a first cross-sectional area, said first cross-sectional area being perpendicular to a longitudinal axis of the sensor tube, the second end of the fill tube has a second cross-sectional area, said second cross-sectional area being perpendicular to a longitudinal axis of the fill tube, and the first cross-sectional area is greater than the second cross-sectional area, and wherein the first cross-sectional area is between 60% and 90% of a sum of the first cross-sectional area and the second cross-sectional area.

9. The transmitter of claim 8, wherein the first cross-sectional area is between 60% and 80% of the sum of the first cross-sectional area and the second cross-sectional area.

10. The transmitter of claim 9, wherein the first cross-sectional area is approximately 67% of the sum of the first cross-sectional area and the second cross-sectional area.

11. The transmitter of claim 8, wherein the first end and the second end have cross-sectional shapes that are at least one of a "D" shape and a half-circle shape.

12. The transmitter of claim 8, wherein the first end and the second end are brazed into the port.

13. The transmitter of claim 8, wherein the port is a raised boss.

14. The transmitter of claim 8, wherein the transmitter is a differential pressure transmitter and the pressure sensor is a differential pressure sensor including a second sensor tube and a second fill tube.

15. An isolator system for a pressure transmitter, the system comprising:
- an isolator rim around a concavity in a transmitter body, the concavity fluidly connected to a port internal to the transmitter through a passageway through the transmitter body;
- an isolator diaphragm including a diaphragm rim sealed to the isolator rim;
- a sensor tube fluidly connecting the passageway to a pressure sensor;
- a fill tube internal to the transmitter, the fill tube fluidly connected to the passageway; and
- isolator liquid filling the sensor tube, the fill tube, the passageway, and the concavity between the isolator diaphragm and the transmitter body; the fill tube adapted to seal the isolator liquid within the transmitter;
- wherein the sensor tube includes a first end disposed in the port, the fill tube includes a second end disposed in the port, the first end of the sensor tube has a first cross-sectional area, said first cross-sectional area being perpendicular to the longitudinal axis of a sensor tube, the second end of the fill tube has a second cross-sectional area, said second cross-sectional area being perpendicular to a longitudinal axis of the fill tube, and the first cross-sectional area is greater than the second cross-sectional area, and wherein the first cross-sectional area is between 60% and 90% of a sum of the first cross-sectional area and the second cross-sectional area.

16. The system of claim 15, wherein the first end of the sensor tube and the second end of the fill tube have cross-sectional shapes that are at least one of a "D" shape and a half-circle shape.

17. The system of claim 15, wherein the first cross-sectional area is between 60% and 80% of the sum of the first cross-sectional area and the second cross-sectional area.

18. The system of claim 17, wherein the first cross-sectional area is approximately 67% of the sum of the first cross-sectional area and the second cross-sectional area.

* * * * *